(12) United States Patent
Riccione et al.

(10) Patent No.: US 12,465,405 B1
(45) Date of Patent: Nov. 11, 2025

(54) AUTOMATED WIRELESS STRUT ASSEMBLY

(71) Applicant: STINGER ORTHOPEDICS, LLC, Boca Raton, FL (US)

(72) Inventors: Nicholas Riccione, Miami Beach, FL (US); Matthew Neber, Miami Beach, FL (US)

(73) Assignee: STINGER ORTHOPEDICS, LLC

( * ) Notice: Subject to any disclaimer, the term of this patent is extended or adjusted under 35 U.S.C. 154(b) by 88 days.

(21) Appl. No.: 18/391,088

(22) Filed: Dec. 20, 2023

(51) Int. Cl.
*A61B 17/66* (2006.01)
*A61B 17/64* (2006.01)
*A61B 17/00* (2006.01)

(52) U.S. Cl.
CPC ............ *A61B 17/66* (2013.01); *A61B 17/645* (2013.01); *A61B 2017/00017* (2013.01); *A61B 2017/00734* (2013.01)

(58) Field of Classification Search
CPC ... A61B 17/8875; A61B 17/66; A61B 17/645; A61B 2017/00991; A61B 2017/606; A61B 2017/00017; A61B 2017/00734
See application file for complete search history.

(56) References Cited

U.S. PATENT DOCUMENTS

| | | |
|---|---|---|
| 5,062,844 A | 11/1991 | Jamison et al. |
| 5,180,380 A | 1/1993 | Pursley et al. |
| 8,282,652 B2 | 10/2012 | Mackenzi et al. |
| 8,439,914 B2 | 5/2013 | Ross et al. |
| 8,702,705 B2 | 4/2014 | Ziran et al. |
| 9,044,271 B2 | 6/2015 | Edelhauser et al. |
| 9,155,559 B2 | 10/2015 | Ross et al. |
| 9,204,937 B2 | 12/2015 | Edelhauser et al. |
| 9,895,167 B2 | 2/2018 | Edelhauser et al. |
| 10,010,350 B2 | 7/2018 | Mannanal et al. |
| 10,082,384 B1 | 9/2018 | Singh |
| 10,368,913 B2 | 8/2019 | Mannanal et al. |
| 10,470,800 B2 | 11/2019 | Bordeaux et al. |
| 11,334,997 B2 | 5/2022 | Gutmann et al. |
| 11,337,732 B2 | 5/2022 | Lavi et al. |
| 2010/0331840 A1 | 12/2010 | Ross et al. |
| 2011/0208187 A1 | 8/2011 | Wong |
| 2017/0354439 A1 | 12/2017 | Mannanal et al. |
| 2018/0055569 A1 | 3/2018 | Wahl et al. |
| 2021/0361322 A1 | 11/2021 | Sun |
| 2022/0354539 A1* | 11/2022 | Ferrante ................. A61B 90/14 |
| 2023/0277220 A1* | 9/2023 | Harari .................... A61B 90/96 606/56 |

\* cited by examiner

*Primary Examiner* — Sameh R Boles
(74) *Attorney, Agent, or Firm* — Albert Bordas, Esq.

(57) ABSTRACT

An automated wireless strut assembly having a lead assembly, a head assembly coupled to the lead assembly, a motor housing coupled to the lead assembly and the head assembly, and a battery assembly coupled to the lead assembly and the motor housing. The lead assembly has a lead shaft, a linear encoder, a control circuitry, an upper clevis having a first connector and a lower clevis having a second connector. A distance between the first and second connectors is automatically adjusted. A computer device automatically connects to the lead assembly through a circuit assembly. The lead assembly is programed through the computer device to make scheduled adjustments automatically.

22 Claims, 12 Drawing Sheets

AUTOMATED WIRELESS STRUT ASSEMBLY

BACKGROUND OF THE INVENTION

The present invention relates to strut assemblies, and more particularly, to a wireless strut assembly.

PRIOR ART

Applicant believes that one of the closest references corresponds to U.S. Pat. No. 10,470,800 B2 issued to Bordeaux, et al. on Nov. 12, 2019, for External bone fixation device. However, it differs from the present invention because Bordeaux, et al. teach an external bone fixation device configured to correct bone deformities or repair bone injuries. The device can include a plurality of bases configured to be attached to portions of a bone and a plurality of struts configured to be adjustable in length to change the position and orientation of the plurality of bases and the attached bone portion.

Applicant believes that another reference corresponds to U.S. Pat. No. 11,337,732 B2 issued to Lavi, et al. on May 24, 2022, for Point and click alignment method for orthopedic surgeons, and surgical and clinical accessories and devices. However, it differs from the present invention because Lavi, et al. teach a point and click method for positioning an external fixator on a patient, in which a surgeon using a computer mouse or similar device inscribes lines or points on a computer screen displaying an x-ray or other photographic image of the bones of a patient together with two rings in position adjacent the bones. By inscribing lines on the computer screen, the underlying drawings program detects the x-y coordinates of any point on the screen when the user (the surgeon or other practitioner) clicks on it, and outputs the x-y coordinates of every point identified by the user including the two points defining any desired line. The practitioner thus can, using "point and click" operation, govern the repositioning of two fixator rings on the bones of a patient.

Applicant believes that another reference corresponds to U.S. Pat. No. 10,010,350 B2 issued to Mannanal, et al. on Jul. 3, 2018, for Gear mechanisms for fixation frame struts. However, it differs from the present invention because Mannanal, et al. teach an adjustable length strut, which includes two joints, a lead screw extending between the joints, and a tube adapted to receive the lead screw. An actuation mechanism with gear teeth extending radially outward of the strut axis is rotatably fixed to the lead screw. A protrusion may be coupled to an end of the lead screw by a rotatable collar, with the protrusion extending through a slot in the tube to mark the length of the strut. A modular attachment member may be adapted to be couple to the first joint and include a worm gear adapted to engage gear teeth of the actuation mechanism. The modular attachment member may include a radiofrequency identity tag mechanism adapted to be read by a tag reader of a tool, the tool adapted to couple to the attachment member to rotate the worm gear to increase or decrease the effective length of the strut.

Applicant believes that another reference corresponds to U.S. Pat. No. 9,155,559 B2 issued to Ross, et al. on Oct. 13, 2015, for External fixator strut. However, it differs from the present invention because Ross, et al. teach an external fixation strut for an external fixation device having ball joints that can be attached to the outer or inner surface of the ring and locked to increase overall stability of the external fixation device. Some embodiments of the fixation strut include a first ball joint coupled to a first end portion of a strut housing, the strut housing having an axial bore defined therethrough. A second ball joint is coupled to a second end portion of an elongated member. The elongated member is coupled to an adjustment mechanism, which is coupled to an upper end portion of an adjustment sleeve. The adjustment sleeve is slidably disposed in the axial bore of the strut housing and is used to effect coarse strut length adjustments.

Applicant believes that another reference corresponds to U.S. Pat. No. 8,702,705 B2 issued to Ziran, et al. on Apr. 22, 2014, for Electromechanically driven external fixator and methods of use. However, it differs from the present invention because Ziran, et al. teach a device for electromechanically and/or electro-pneumatically positioning a fractured bone having a first clamping unit adapted for attachment to the bone by at least one first bone fastener, a second clamping unit adapted for attachment to the bone by at least one second bone fastener, and at least one of: (i) a translation component operatively driven by a translational driver for relative translational movement of one clamping unit with respect to the other along a translational axis; (ii) an angulation component operatively driven by an angulational driver for relative angulational movement of one clamping unit with respect to the other along an articulation axis; and (iii) a rotational component operatively driven by a rotational driver for relative rotational movement of one clamping unit with respect to the other along a rotational axis.

Applicant believes that another reference corresponds to U.S. Pat. No. 8,282,652 B2 issued to Mackenzi, et al. on Oct. 9, 2012, for Force-controlled autodistraction. However, it differs from the present invention because Mackenzi, et al. teach a distractor coupled to first and second fixators, which are coupled to first and second portions of the bone, respectively, on opposite sides of an osteotomy of the bone. A motor produces a motion of the first fixator relative to the second fixator such that the first portion of the bone is distracted from the second portion of the bone. A force sensor measures a resistant force to the motion, and a distractor displacement sensor measures a distractor displacement. A controller is operably coupled to the force sensor, the distractor displacement sensor, and the motor. The controller is configured to determine a variable limb stiffness using the resistant force, the distractor displacement, and a known distractor stiffness of the distractor, and to adjust a gain of the motor such that the variable limb stiffness matches a desired limb stiffness.

Applicant believes that another reference corresponds to U.S. Pat. No. 9,044,271 B2 issued to Edelhauser, et al. on Jun. 2, 2015, for External fixation system. However, it differs from the present invention because Edelhauser, et al. teach an external fixation system comprising first and second planar at least part-circular ring elements, the first ring element having a circumferential track extending along the part-circular circumference thereof; a plurality of struts each having a first and second end, the first end of each strut coupled to the first ring by a first connector and the second end of each strut coupled to a second ring by a second connector, the first connector including a spherical joint; the second connector non-rotatably coupled to the second ring, the strut second end being coupled to the second connector by a U-joint; shuttles mounted on the track of the first ring for movement there along with one shuttle coupled to each strut; and means for controlling the angular position of each strut second end and means for controlling the position of each shuttle along the circumferential track on the first ring.

Applicant believes that another reference corresponds to U.S. Pat. No. 5,180,380 A issued to Pursley, et al. on Jan. 19, 1993, for Automatic compression-distraction-torsion method and apparatus. However, it differs from the present invention because Pursley, et al. teach an orthopedic system, which includes a plurality of support members, a plurality of rods interconnecting the support members, a plurality of pins attached to the support members for passing through bone of a patient, and an automatic drive device to control an adjustment mechanism of the rods to adjust the rod length of the rods to alter the relative positions of the support members. The drive device includes at least one motor for incrementally adjusting the adjustment mechanism of at least one of the rods and a controller device for providing pulses to the motor and for storing information regarding the number of stepwise adjustments of the rod length by the motor.

Applicant believes that another reference corresponds to U.S. Pat. No. 11,334,997 B2 issued to Gutmann, et al. on May 17, 2022, for Hinge detection for orthopedic fixation. However, it differs from the present invention because Gutmann, et al. teach images displayed of anatomical structure segments with an attached fixator. Indications may be received of first image hinge locations of a plurality of hinges of the fixator in the first image. Projected second image hinge locations may be determined based at least in part on the first image hinge locations. Hinge candidates may be detected in the second image having shapes associated with the plurality of hinges. The hinges candidates may be detected by computer software using automated software-based image analysis techniques. Adjusted second image hinge locations may then be calculated based at least in part on the projected second image hinge locations and candidate second image hinge locations. The adjusted second image hinge locations may be used to determine physical locations of the fixator and anatomical structure segments in three-dimensional space, which may be used to determine manipulations to the fixator for deformity correction.

Applicant believes that another reference corresponds to U.S. Pat. No. 10,368,913 B2 issued to Mannanal, et al. on Aug. 6, 2019, for Adjustment instrument with tactile feedback. However, it differs from the present invention because Mannanal, et al. teach an external fixation frame system that includes a first ring, a second ring, and at least three struts configured to couple the first ring to the second ring, each strut having a rotatable head portion and a counter torque portion. The system may also include an adjustment tool that includes a driver portion having an inner engagement portion for engaging the head portion of the strut, an outer engagement portion for engaging the counter torque portion of the strut, and a feedback mechanism rotatably coupled to the inner and outer engagement portions. The tool may further include a plunger having an inner portion positioned at least partially within the inner engagement portion, and an outer portion positioned at least partially between the inner engagement portion and the outer engagement portions, the plunger being axially translatable with respect to the inner and outer engagement portions.

Applicant believes that another reference corresponds to U.S. Pat. No. 9,204,937 B2 issued to Edelhauser, et al. on Dec. 8, 2015, for Software for use with deformity correction. However, it differs from the present invention because Edelhauser, et al. teach a software used in planning the correction of bone deformities preoperatively or postoperatively, and in particular relates to virtually manipulating rings and struts of an external fixation frame in order to plan the steps for making a desired correction to two or more bone portions of a patient. The software can be used prior to surgery, allowing a user to virtually define a bone deformity, and virtually add and manipulate fixation rings and struts to the bone deformity. Based on the virtual manipulations, a correction plan can be generated that describes length adjustments that should be made to the plurality of model struts over a period of time to correct the bone deformity. The software can also be used after surgical fixation of the fixation frame and struts to the deformed bone.

Applicant believes that another reference corresponds to U.S. Pat. No. 9,895,167 B2 issued to Edelhauser, et al. on Feb. 20, 2018, for Ring hole planning for external fixation frames. However, it differs from the present invention because Edelhauser, et al. teach an external fixation system that includes first and second fixation members having first and second pluralities of mounting holes, respectively. The first and second plurality of holes are configured to receive first and second ends of a plurality of struts, each strut having a default or initial mounting position. A simulation of the correction may be performed with the struts in the default positions, but it may be determined that the correction is not achievable. Additional simulations of the correction may be performed with the ends of the struts in different mounting positions to determine if other mounting positions of the struts allow the correction to be completed. During the correction, if one of the struts reaches a maximum length, it may be disconnected and reconnected to a different mounting hole so that, after being reconnected, the strut may be further increased in length to continue the correction.

Applicant believes that another reference corresponds to U.S. Pat. No. 10,082,384 B2 issued to Singh on Sep. 25, 2018, for Systems and methods for detecting fixation frame parameters. However, it differs from the present invention because Singh teaches a detection device, such as a camera-enabled smart phone, which may be used to take one or more pictures of an external fixation frame attached to a patient. The pictures may be transmitted to a computer system accessible by the patient's physician. The computer system may uniquely identify each strut of the external fixation frame and determine the length of each strut. The computer system may compare the determined length of each strut to a planned length of the struts for a particular time interval as outlined in a correction plan. If the struts are the correct length for the particular time interval, the fact may be indicated to the physician and transmitted to the patient. If the struts are not the correct length, the computer system may update the correction plan to account for the discrepancy plan, with the updated correction plan transmitted to the patient.

Applicant believes that another reference corresponds to U.S. Pat. No. 5,062,844 A issued to Jamison, et al. on Nov. 5, 1991, for Method and apparatus for the fixation of bone fractures, limb lengthening and the correction of deformities. However, it differs from the present invention because Jamison, et al. teach a method and apparatus for the fixation of bone fractures, limb lengthening, and the correction of deformities, which uses an improved composite plastic carbon fiber ring that is formed in a mold or machined with a stepped end portion that allows half rings to be assembled in a common plane. The method can use a mold wherein multiple rings can be formed by stacking the rings with a Teflon layer therebetween and wherein circumferential braid reinforcement of carbon fiber adds strength at the circumferential inner and outer curved surfaces of the rings and half rings.

Applicant believes that another reference corresponds to U.S. Pat. No. 8,439,914 B2 issued to Ross, et al. on May 14, 2013, for External fixation strut. However, it differs from the present invention because Ross, et al. teach an external fixation strut for an external fixation device having a ball joint that can be attached to the outer or inner surface of the ring and locked to increase overall stability of the external fixation device. Some embodiments of the fixation strut include a first ball joint coupled to a first end portion of a strut housing, the strut housing having an axial bore defined therethrough. A second ball joint is coupled to a second end portion of a threaded elongated member. The threaded elongated member is threadably coupled to an adjustment mechanism, which is rotatably coupled to an upper end portion of an adjustment sleeve. The adjustment sleeve is slidably disposed in the axial bore of the strut housing and is used to effect coarse strut length adjustments.

Applicant believes that another reference corresponds to U.S. Patent Application Publication No. 2017/0354439 A1, published on Dec. 14, 2017, to Mannanal, Subash K., et al. for Gear mechanisms for fixation frame struts. However, it differs from the present invention because Mannanal, Subash K.; et al. teach an adjustable length strut including two joints, a lead screw extending between the joints, and a tube adapted to receive the lead screw. An actuation mechanism with gear teeth extending radially outward of the strut axis is rotatably fixed to the lead screw. A protrusion may be coupled to an end of the lead screw by a rotatable collar, with the protrusion extending through a slot in the tube to mark the length of the strut. A modular attachment member may be adapted to be couple to the first joint and include a worm gear adapted to engage gear teeth of the actuation mechanism. The modular attachment member may include a radiofrequency identity tag mechanism adapted to be read by a tag reader of a tool, the tool adapted to couple to the attachment member to rotate the worm gear to increase or decrease the effective length of the strut.

Applicant believes that another reference corresponds to U.S. Patent Application Publication No. 2021/0361322 A1, published on Nov. 25, 2021, to Tao Sun for Automatic recognition method for spatial position and pose of parallel external fixator for fracture reduction. However, it differs from the present invention because Sun teaches an automatic recognition method for spatial position and pose of parallel external fixator, including the following steps of: installing three markers on each of the two fixation rings of the parallel external fixator; obtaining 3D images of six marker balls after scanning and reconstruction by a common 3D clinical imaging system; recognizing the sphere center coordinates of the six marker balls by sphere fitting algorithm; according to the mounting configuration of the markers on the two fixation rings, establishing coordinate systems of two fixation rings and determining the spatial position and pose of the external fixator; in addition, by obtaining the 3D images of the fracture bone segments with the 3D clinical imaging system and simulating the movement of the fracture deformity correction, the adjustment schedule of the external fixator struts can be achieved.

Applicant believes that another reference corresponds to U.S. Patent Application Publication No. 2011/0208187 A1, published on Aug. 25, 2011, to Wong, Kian-Ming for Orthopedic external fixation device. However, it differs from the present invention because Wong teaches a telescopically adjustable strut for use with orthopedic external fixators, which has a first end and a second end and includes a universal-hinged connector provided at each of the first and second ends for connecting the strut to orthopedic external fixator base members. The universal-hinged connector is configured and adapted for pivoting the strut relative to the base members and to lock the universal-hinged connector at a desired angle.

Applicant believes that another reference corresponds to U.S. Patent Application Publication No. 2018/0055569 A1, published on Mar. 1, 2018, to Wahl Michael; et al. for Orthopedic fixation control and manipulation. However, it differs from the present invention because Wahl Michael, et al. teach a fixation apparatus may be attached to first and second anatomical structure segments. Images of the fixation apparatus and the attached anatomical structure segments may then be captured. In some examples, the images need not necessarily be orthogonal with respect to one another. Configuration information associated with the fixation apparatus may then be received. Additionally, first image information may be received, for example including indications of one or more locations, within the images, of at least part of one or more elements of the fixation apparatus. Additionally, second image information may be received, for example including indications of one or more locations, within the images, of at least part of the first and the second anatomical structure segments. Manipulations to the fixation apparatus for correction of the anatomical structure deformity may then be determined, and indications of the determined manipulations may then be provided to one or more users.

Applicant believes that another reference corresponds to U.S. Patent Application Publication No. 2010/0331840 A1, published on Feb. 12, 2009, to John D, et al. for Fast adjust external fixation connection rod. However, it differs from the present invention because John D., et al. teach an external fixation connection rod having articulatable joints that can be attached to external supports, such as rings. In some embodiments, the fixation connection rod includes a telescopic rod and connecting mechanisms for coupling the joints of the connection rod to the external supports, and the connecting mechanisms are operable to substantially lock the orientation of the joints. In some other embodiments, the connection rod includes a housing having parallel axial bores defined therethrough and sleeves slidably disposed in the axial bores.

SUMMARY OF THE INVENTION

The present invention is an automated wireless strut assembly, comprising a lead assembly, a motor housing, and a battery assembly. The lead assembly has a lead shaft, a linear encoder embedded in the lead shaft, and a control circuitry.

The lead assembly further comprises a head assembly and a main body. The control circuitry reads the linear encoder and a motor moves the lead shaft through wireless communication.

The lead assembly is coupled to the head assembly, the motor housing, and the battery assembly, whereby the motor housing is coupled to the head assembly and the lead assembly by one of its faces and receives the battery assembly at the bottom.

The lead assembly comprises a lead shaft, a linear encoder, a control circuitry, an upper clevis having a first connector and a lower clevis having a second connector.

The lead assembly further comprises a main body having a cavity, which receives the lead shaft. The linear encoder is attached to the lead shaft and the control circuitry are attached to the main body.

The lead shaft moves linearly through the cavity, whereby the control circuitry is able to read the position of the lead shaft from the linear encoder.

The main body comprises indents that receive the lower clevis. The lower clevis is able to rotate around the main body.

The head assembly comprises a housing, a bearing, a coupler, first and second gears, and a lead nut. The housing defines a housing cavity, which receives the lead nut. The lead shaft passthrough the housing cavity and the lead nut.

The head assembly is secured onto a top edge of the lead assembly, whereby first and second channels receive first and second lips of the head assembly.

The motor housing comprises a main housing, visual wave guides, a lever, a circuit assembly, and a motor. The coupler allow the lead shaft to engage or disengage with the lead nut.

The battery assembly comprises a battery housing having a top wall, which houses a battery.

The top wall comprises first and second hollow protrusions, which are secured inside the motor housing, specifically the main housing, and by which first and second battery contacts passthrough. The hollow protrusions form a seal to the motor housing so that battery contacts are sealed from environment.

A distance between the first and second connectors is automatically adjusted. A computer device wirelessly connects to the lead assembly through the circuit assembly. The lead assembly is programed through the computer device to make scheduled adjustments automatically.

A set of strut assemblies are connected to first and second frames of an external fixation system through respective the first and second connectors, building a wireless independent networking schema for monitoring and self-management of the strut assemblies on the external fixation system.

The automated wireless strut assembly further comprises a bridge device for remote connectivity between the computer device and the strut assembly.

The computer device comprises an executable application having a distraction file containing instructions for entire spatial movements, wherein the distraction file is automatically separated into individual movements of the lead assembly and stored for each of the circuit assembly. The strut assembly is wirelessly connected to the computer device.

In general, present invention is an automated wireless strut assembly comprising a lead shaft, a linear encoder embedded in said lead shaft, an electromechanical drive variably coupled to said lead shaft, a control circuitry, and batteries.

Another object of the present invention is an automated wireless strut assembly comprising a lead shaft, a linear encoder embedded in the lead shaft, an electromechanical drive variably coupled to the lead shaft, a control circuitry, and batteries.

The control circuitry stores instruction set, communicated wirelessly from a computer device. The control circuitry controls a motor to follow the instruction set based on position readings from the linear encoder.

The control circuitry notifies the computer device of its status, the linear encoder position, and progress wirelessly.

Another object of the present invention is a method of treating a bone deformity or fusing a joint or stabilizing a fracture in a subject in need of such treatment, wherein the method comprises the steps of:
A) Applying an external fixator system;
B) analyzing radiographs manually or by a software;
C) generating a prescription;
D) entering the prescription into an application that communicates with wireless automated struts assemblies via wireless transmission to store the prescription;
E) adjusting each strut assembly according to the prescription via wireless transmission.

An status and progress of the strut assemblies or other patient related data is relayed back to a surgeon via wireless transmission.

The data obtained via the wireless transmission from the strut assemblies is used in the generation of a distraction prescription, in the initial prescription generation, prescription revisions, or both.

It is therefore one of the main objects of the present invention to provide an automated wireless strut assembly.

It is another object of this invention to provide an automated wireless strut assembly having a magnetic strip or linear encoder on the lead shaft to read the lengths.

It is another object of this invention to provide an automated wireless strut assembly, which is manually and automatically adjusted.

It is another object of this invention to provide an automated wireless strut assembly to implement a proprietary intelligent networking schema for monitoring and self-management of the system.

It is another object of this invention to provide an automated wireless strut assembly, which contains memory for network management and autonomous execution of the program or instruction set.

It is another object of this invention to provide an automated wireless strut assembly, which is connected to the internet via a bridge device so that the system is under constant surveillance and the system can notify the surgeon (or care giver) if any problems occur.

It is another object of this invention to provide an automated wireless strut assembly, which is built for easy installation/replacement.

It is another object of this invention to provide an automated wireless strut assembly, which is easily programable for each patient by a surgeon, on a case-by-case basis.

It is another object of this invention to provide an automated wireless strut assembly, which has no visible wiring or wired connections to other devices.

It is another object of this invention to provide an automated wireless strut assembly, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

Figure 1:
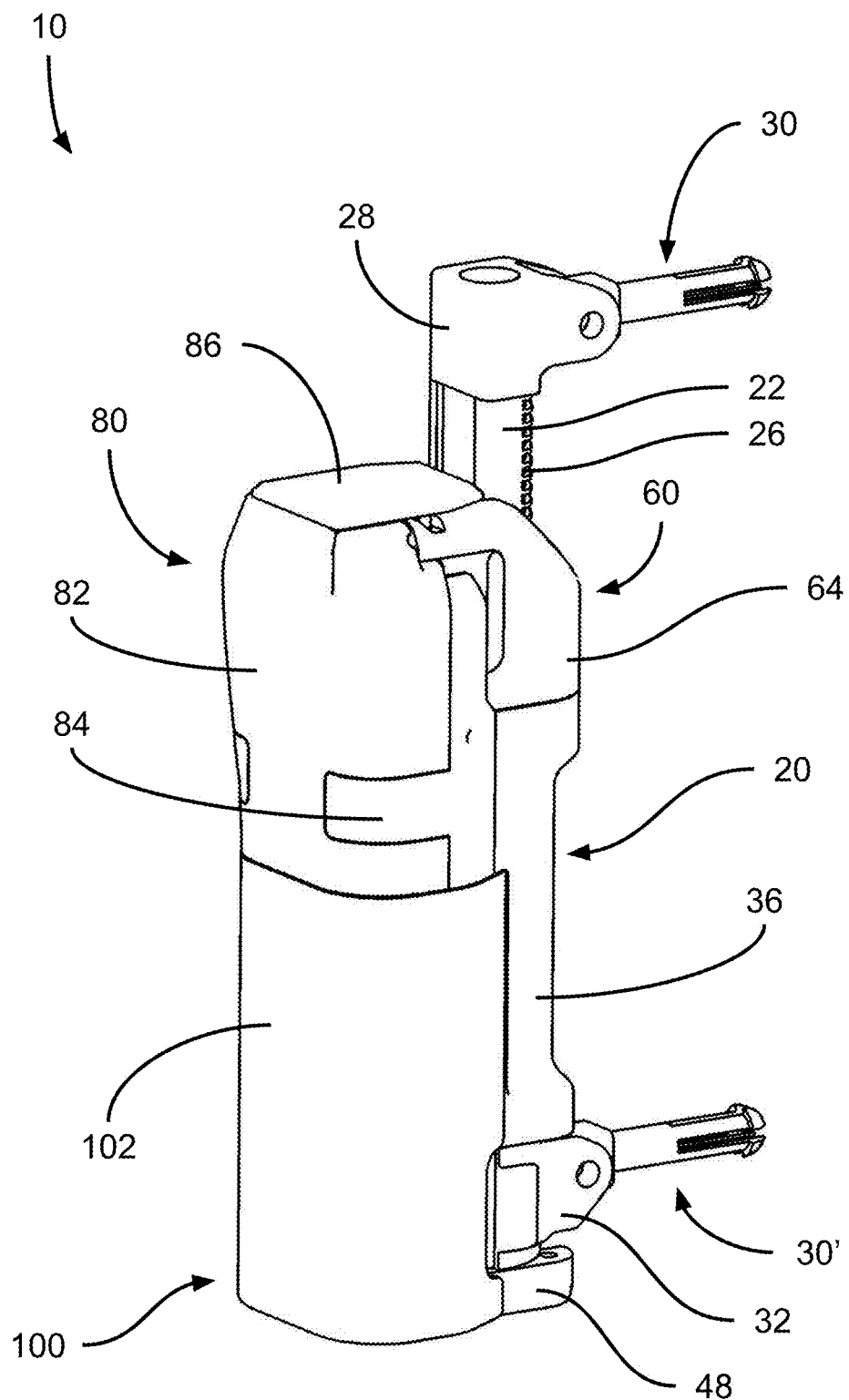
FIG. 1 represents an isometric view of the present invention.

Referring now to the drawings, the present invention is an automated wireless strut assembly, also referred as strut assembly, and is generally referred to with numeral 10. It can be observed that it basically includes lead assembly 20, head assembly 60, motor housing 80, and battery assembly 100.

Figure 2:
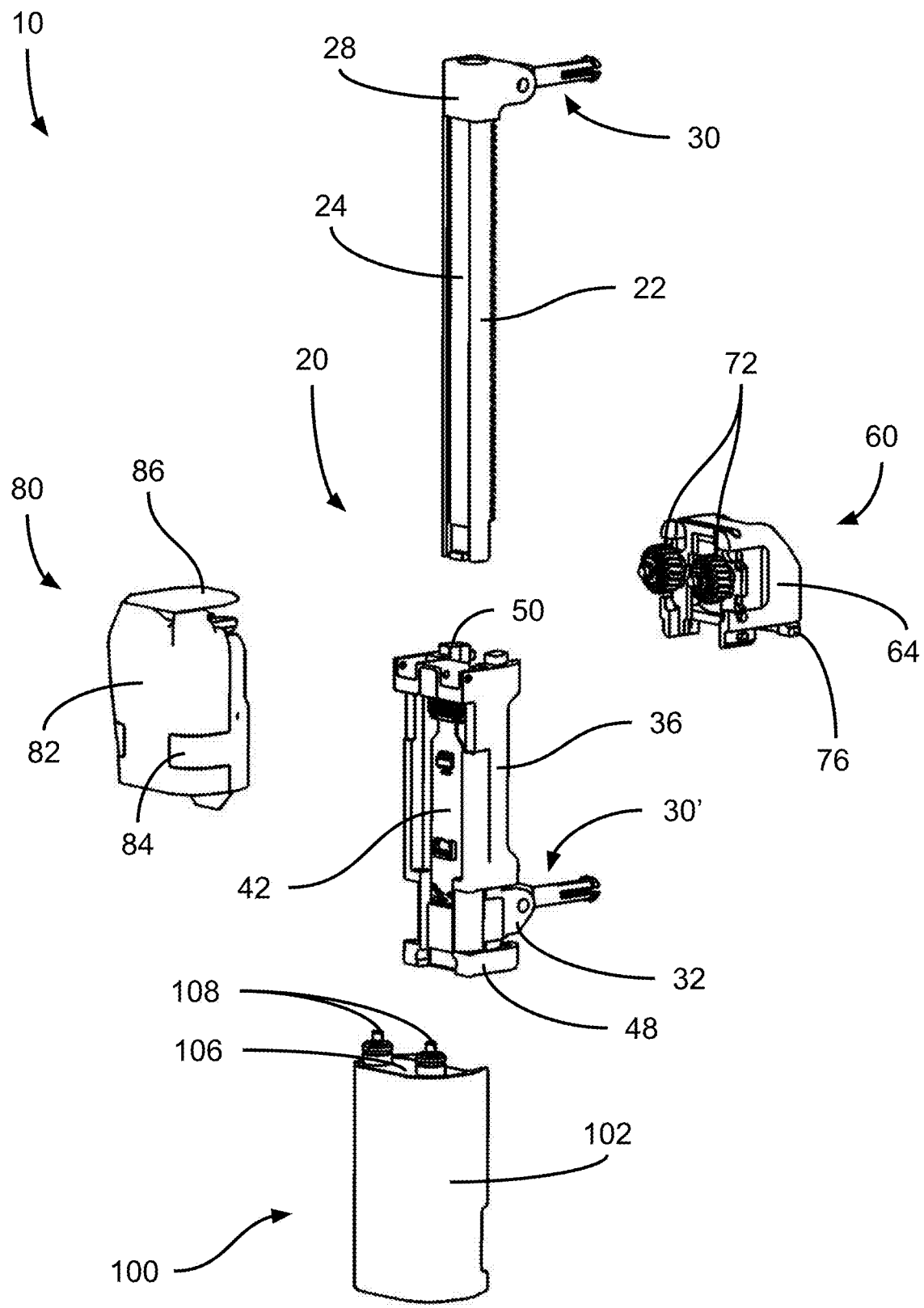
FIG. 2 is an isometric view of the present invention disassembled.

As seen in FIGS. 1 and 2, lead assembly 20 also referred as strut assembly, comprises head assembly 60 and main body 36. Lead assembly 20 is coupled to head assembly 60. Head assembly 60 is secured onto top edge 50 of lead assembly 20, whereby first and second channels 52, seen in FIG. 3, receive first and second lips 76 of head assembly 60.

Motor housing 80 is coupled to lead assembly 20 and head assembly 60. Motor housing 80 receives battery assembly 100 at its bottom, which is also attached to main body 36 of lead assembly 20.

Figure 3:
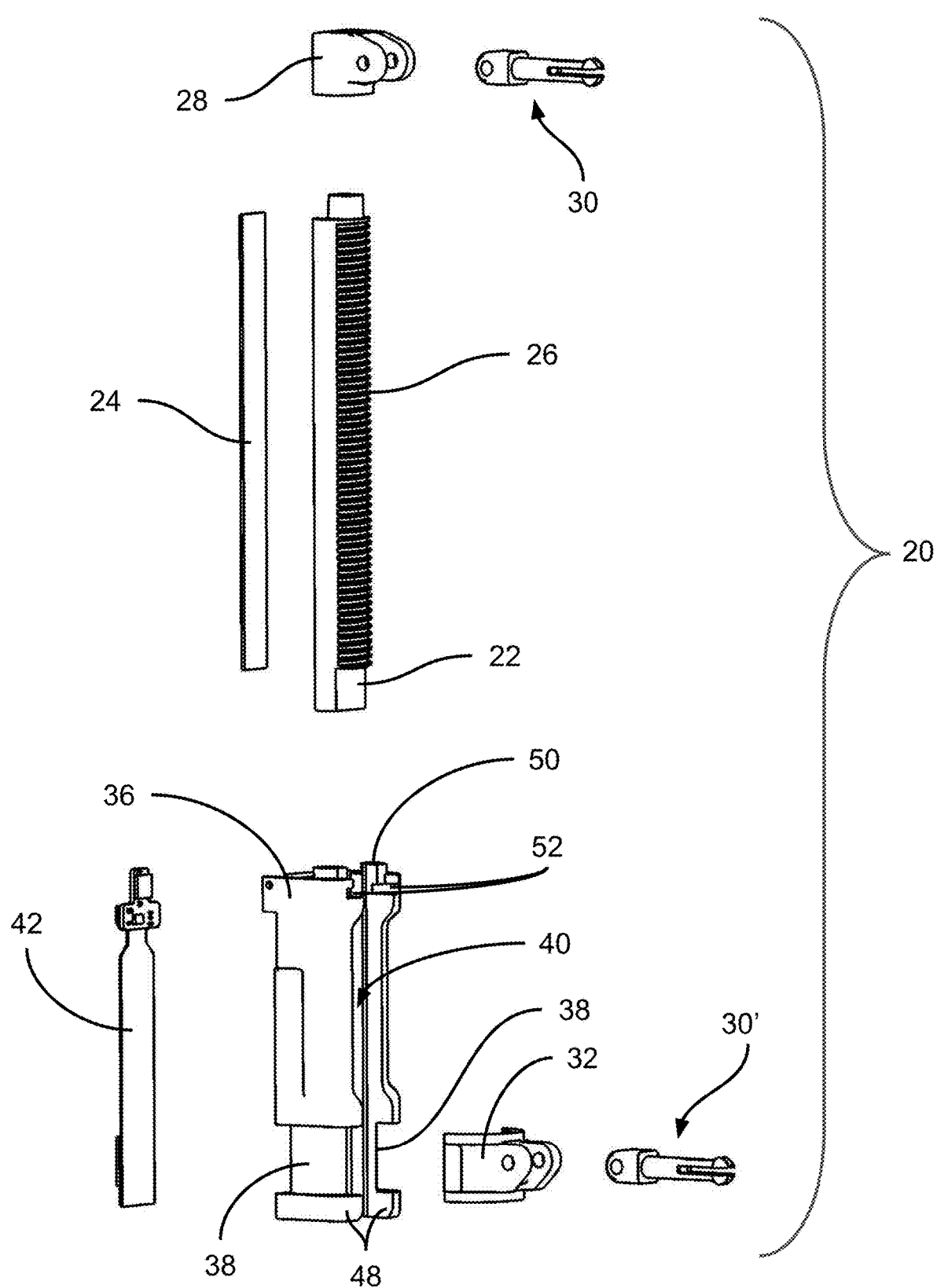
FIG. 3 is an exploded view of the lead assembly of the present invention.

As seen in FIGS. 2 and 3, lead assembly 20 comprises lead shaft 22, linear encoder 24, threads 26, upper clevis 28, lower clevis 32, and control circuitry 42.

Upper clevis 28 has first connector 30 and lower clevis 32 has second connector 30'. Main body 36 defines indents 38 above bases 48 that receive lower clevis 32.

Main body 36 comprises cavity 40, which receives lead shaft 22. Linear encoder 24 is attached to lead shaft 22 opposite to threads 26. Control circuitry 42 fit into main body 36.

Control circuitry 42 reads linear encoder 24 and motor 90 moves lead shaft 22 through wireless communication.

Lead shaft 22 moves linearly through cavity 40, whereby control circuitry 42 is able to read the position of lead shaft 22 from linear encoder 24.

Figure 4:
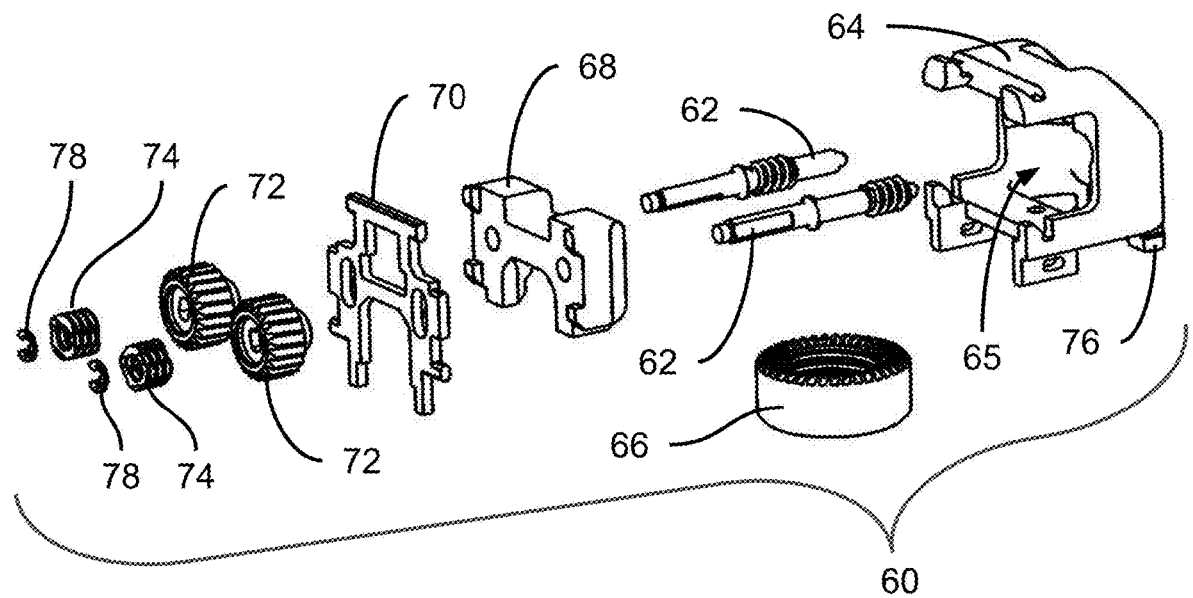
FIG. 4 is an exploded view of the head assembly of the present invention.

As seen in FIG. 4, head assembly 60 comprises housing 64 having shafts 62, which receive bearing 68, coupler 70, and first and second gears 72.

Housing 64 defines housing cavity 65, which receives lead nut 66. Lead shaft 22, as seen in FIG. 1, passthrough housing cavity 65 and lead nut 66.

Head assembly 60 further comprises springs 74 and retainers 78.

Figure 5:
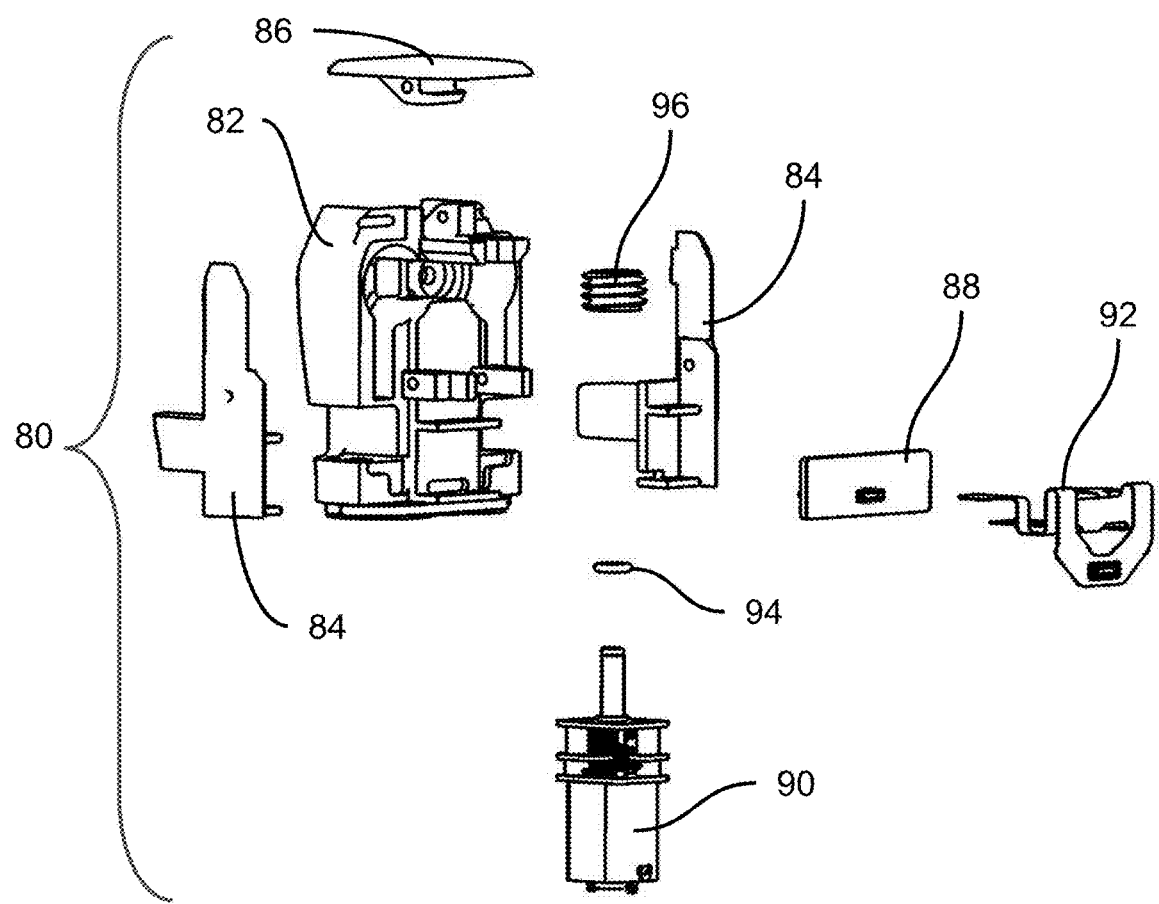
FIG. 5 is an exploded view of the motor housing of the present invention.

As seen in FIG. 5, motor housing 80 comprises main housing 82 having visual wave guides 84 attached at the lateral sides and lever 86 at the top.

Main housing 82 houses circuit assembly 88 and motor 90.

Motor housing 80 further comprises circuit connector 92, seal 94, and worm gear 96.

Figure 6:
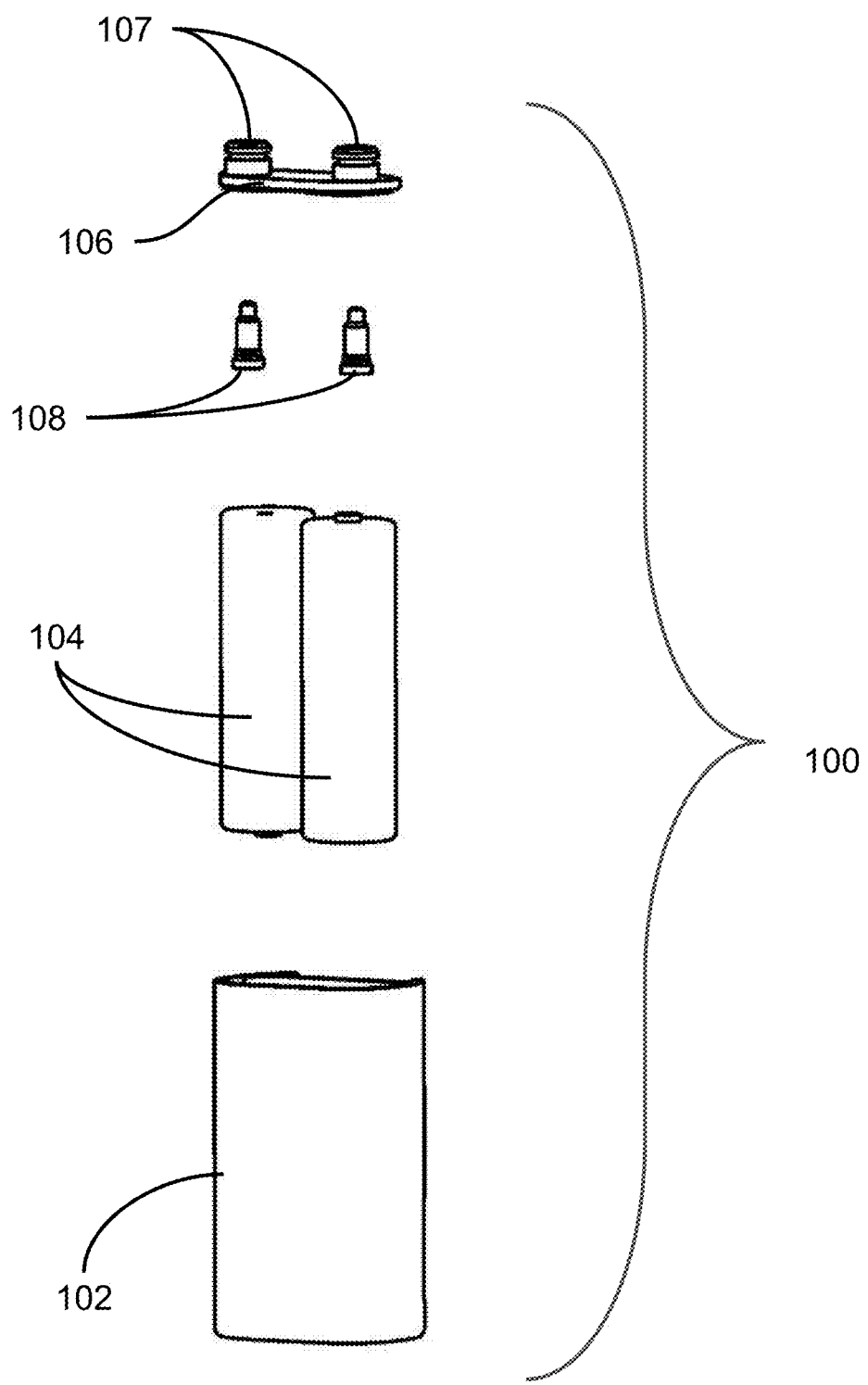
FIG. 6 is an exploded view of the battery assembly of the present invention.

As seen in FIG. 6, battery assembly 100 comprises battery housing 102 having top wall 106, which houses battery 104.

Top wall 106 comprises first and second hollow protrusions 107, which are secured inside main housing 82 of motor housing 80, seen in FIG. 5, and by which first and second battery contacts 108 passthrough.

Figure 7A:
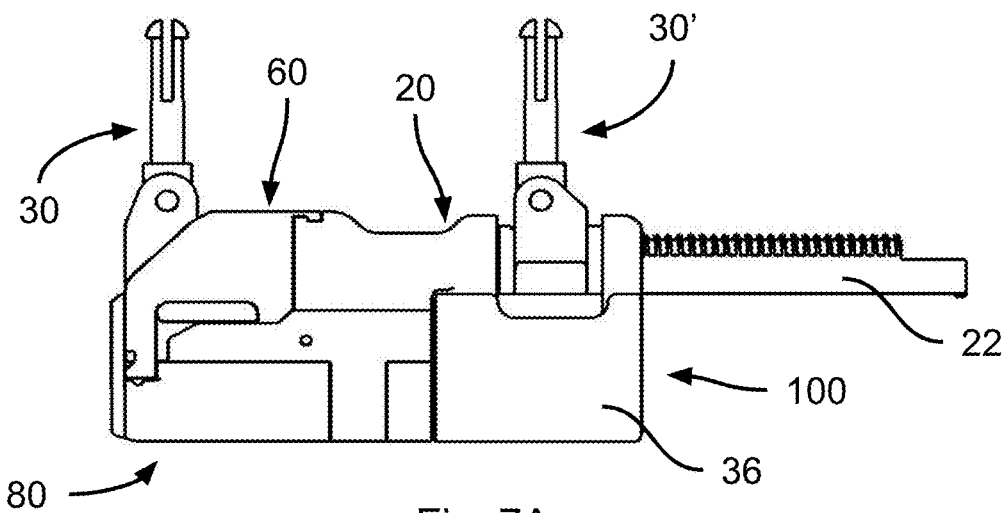
FIG. 7A is a view of the present invention representing the connectors spaced from each other a first predetermined distance.
Figure 7B:
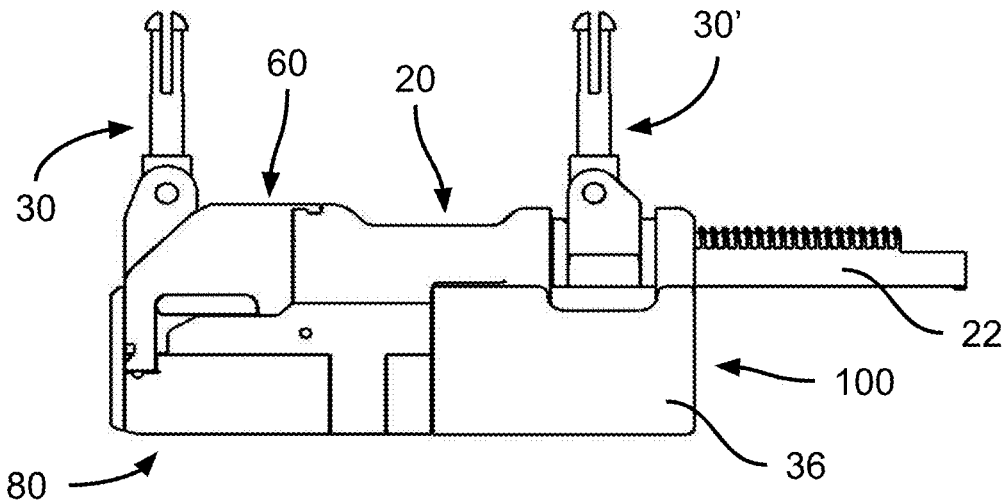
FIG. 7B is a view of the present invention representing the connectors spaced from each other a second predetermined distance.
Figure 7C:
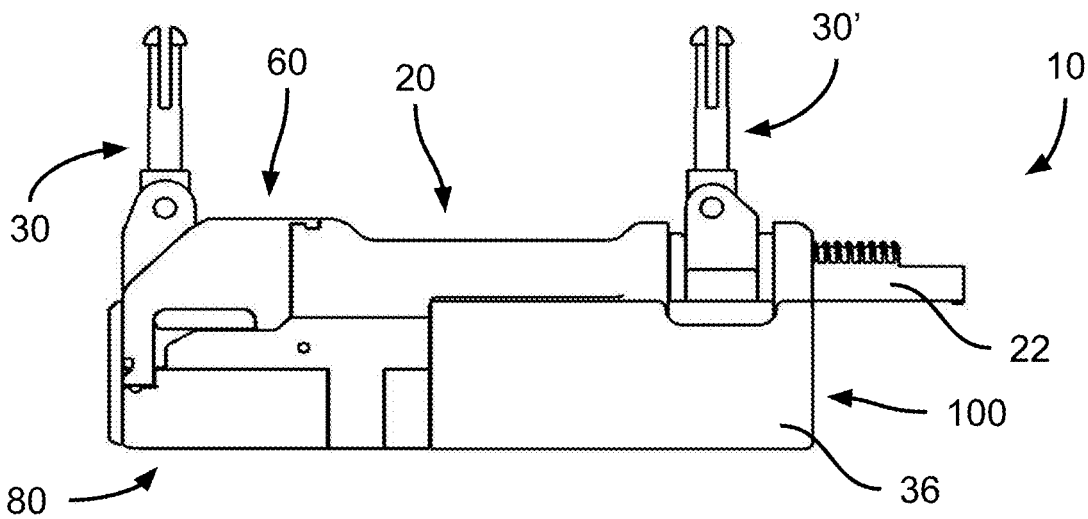
FIG. 7C is a view of the present invention representing the connectors spaced from each other a third predetermined distance.

As seen in FIGS. 7A, 7B, and 7C, there are different strut assembly 10 sizes by changing the length of main body 36. Therefore, the distance between connector 30 and connector 30' may be adjusted as desired. This distance between connectors 30 and 30' may be manually and automatically adjusted.

Figure 8A:
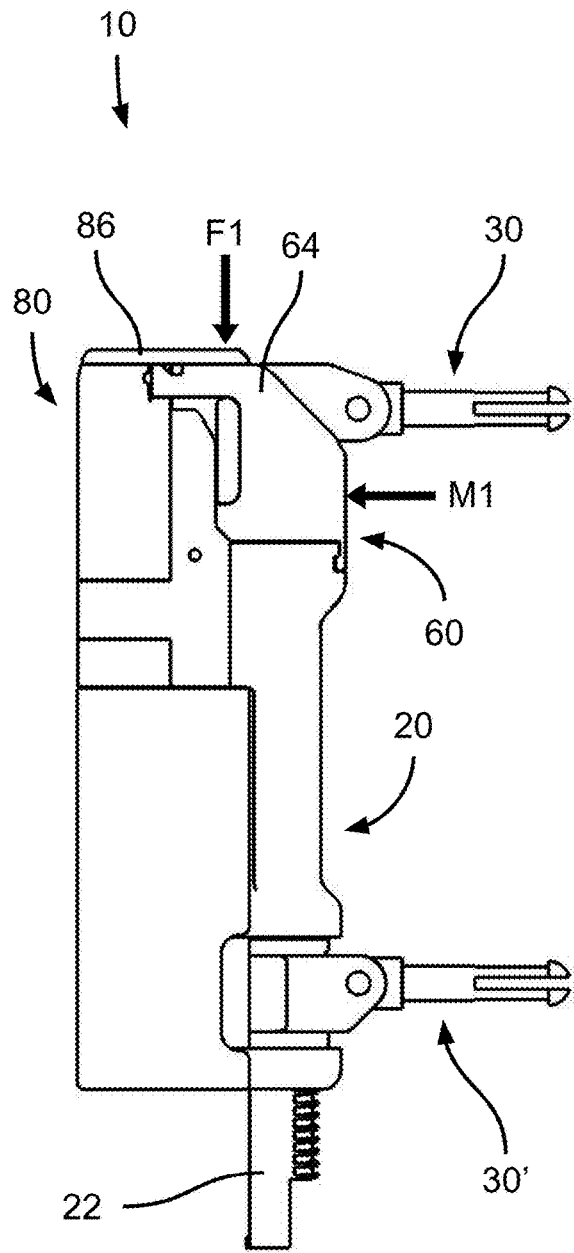
FIG. 8A is a representation of a lever in a closed configuration when a predetermined force is applied by which a lead nut disengages from lead shaft.
Figure 8B:
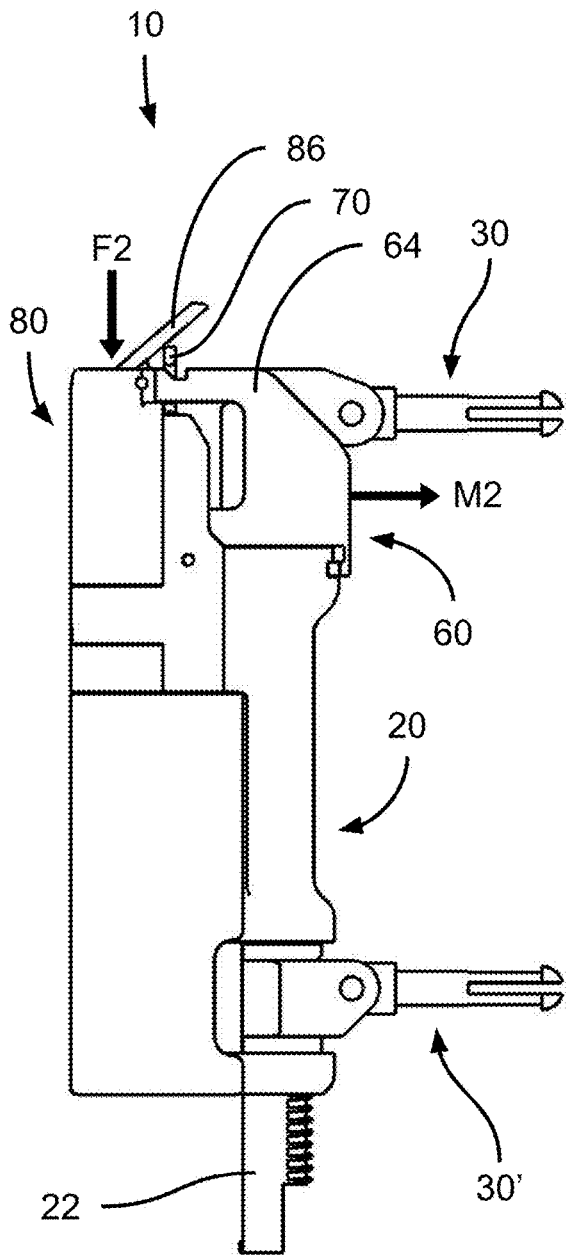
FIG. 8B is a representation of the lever in an open configuration when a predetermined force is applied by which the lead nut engages with lead shaft.

As seen in FIGS. 8A and 8B, lever 86 engages coupler 70 with a release mechanism, which allow lead shaft 22 to engage or disengage with lead nut 66, seen in FIG. 4.

A predetermined force F1 applied by a user on a side of lever 86, results in motion M1 to disengage lead nut 66 from lead shaft 22.

A predetermined force F2 applied by a user at the opposite side of lever 86, results in motion M2 to engage lead 66 nut with lead shaft 22.

Figure 9A:
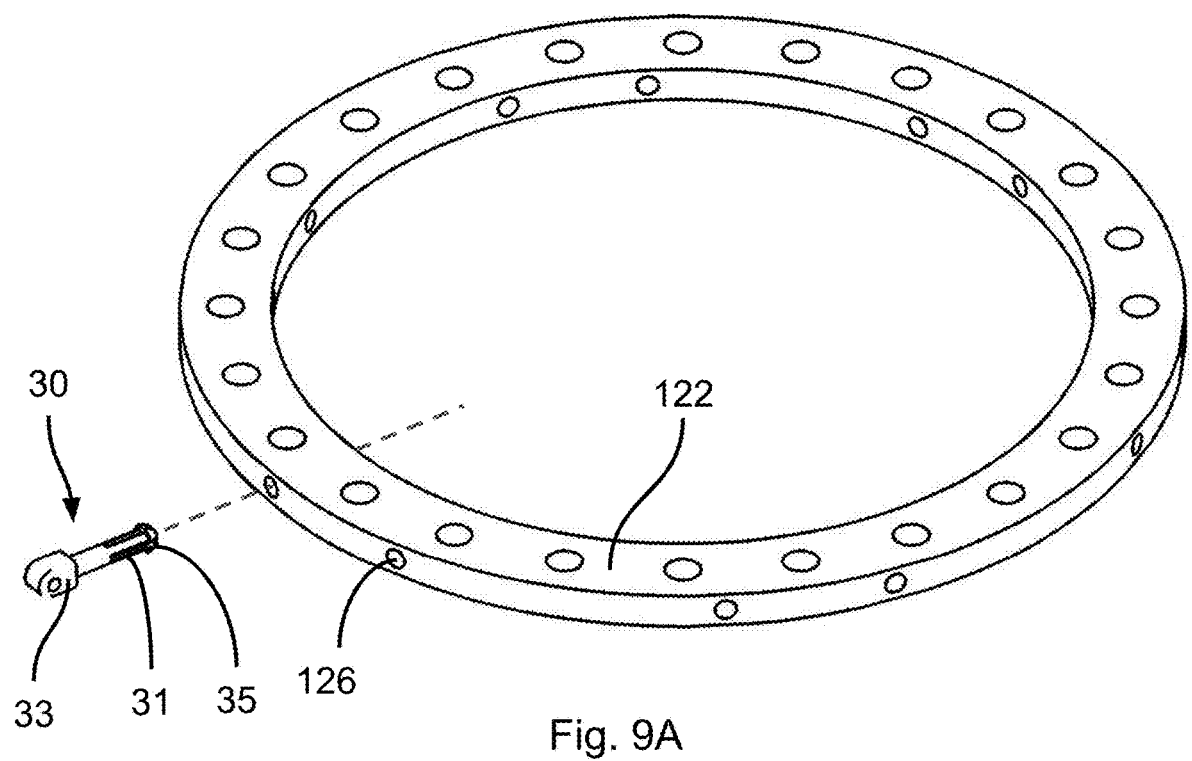
FIG. 9A is an isometric view of the present invention attached to an external fixation system.
Figure 9B:
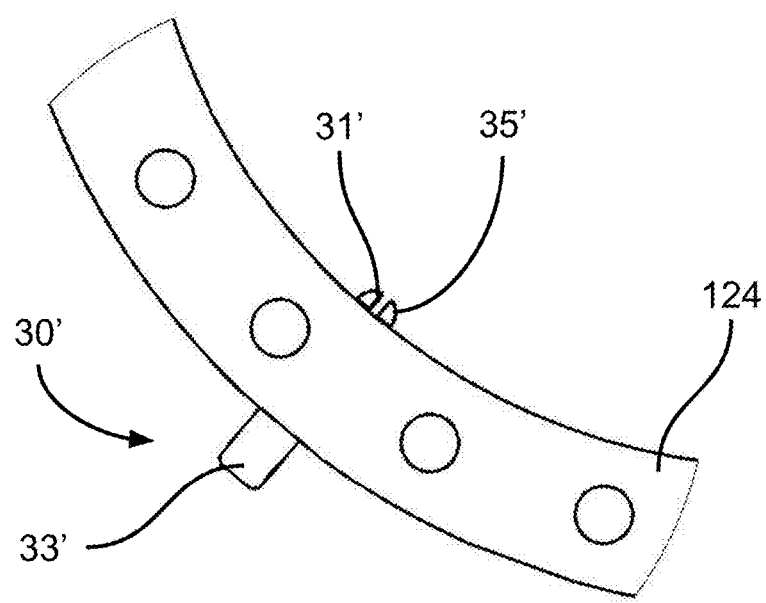
FIG. 9B is an isometric view of the present invention attached to an external fixation system fixed to a bone.

As seen in FIGS. 9A and 9B a set of strut assemblies 10 are part of external fixation system 120. Strut assemblies 10 are connected to first and second frames 122 and 124 of external fixation system 120, building a wireless independent networking schema for monitoring and self-management of strut assemblies 10 on the external fixation system 120. External fixator system 120 is connected with monitor 150.

Present invention 10 allows to automate external fixation system 120 used for medical distraction of bones B. Medical distraction is used for fusions, corrections, and reconstructions of bones B. External fixator system 120 attaches to bone B typically in two (or more) places with the ability to move the two bone B sides in all 6 degrees of freedom (6DOF) relative to one another.

Figure 10A:
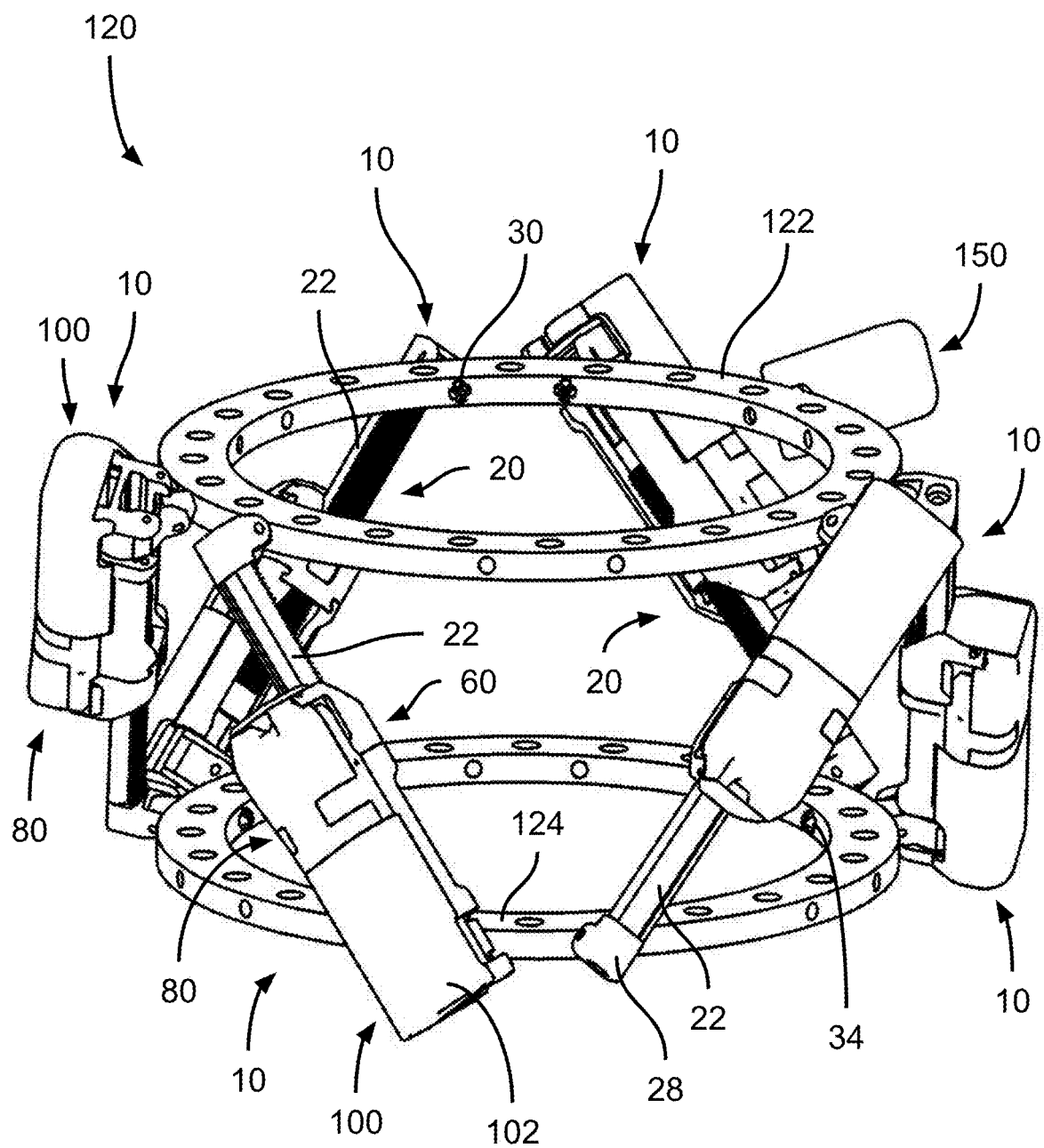
FIG. 10A is a view representing a connector being inserted of a frame of the external fixation system.
Figure 10B:
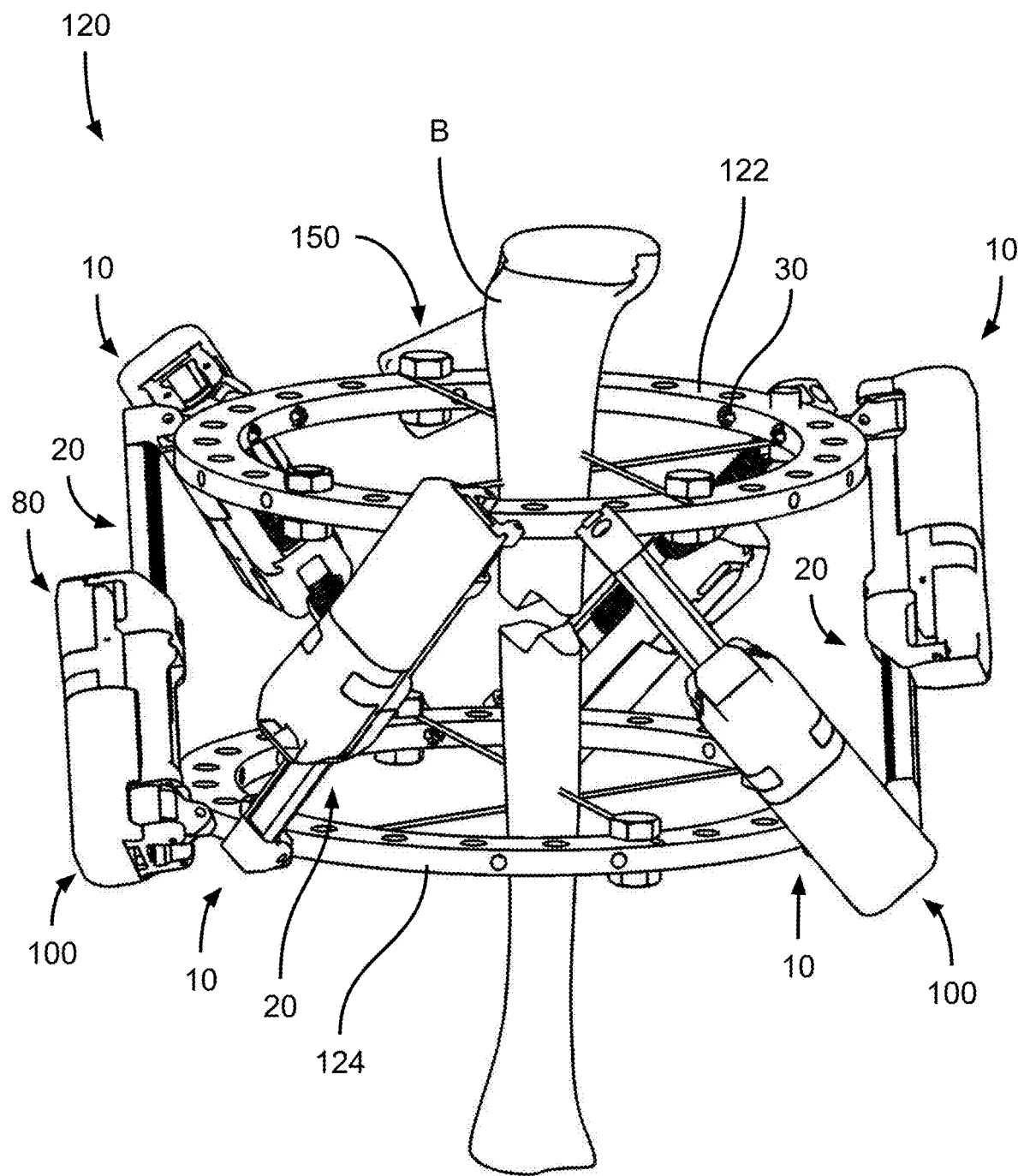
FIG. 10B is a view representing the connector secured on the frame of the external fixation system.

As seen in FIGS. 9B, 10A, 10B, strut assemblies 10 are connected to first and second frames 122 and 124 of external fixation system 120 through respective first and second connectors 30 and 30'. Connectors 30 and 30' passthrough respective frame hole 126 on frame 122 and 124 when a predetermined force is applied.

Pin heads 35 and 35' comprise a first predetermined diameter, pin ends 33 and 33' comprise a second predetermined diameter, and frame holes 126 comprise a third predetermined diameter smaller than the first and second predetermined diameters. Therefore, pin ends 33 and 33' and pin heads 35 and 35' act as stoppers securing connector 30 and 30' inside respective frame hole 126.

When a predetermined pressure is applied to pin head 35, aperture 31 becomes tighter making pin head 35 smaller allowing pin head 35 to enter into frame hole 126. Once pin head 35 releases, and no pressure is applied, aperture 31 opens and pin head 35 recovers its first predetermined diameter securing connector 30 inside frame hole 126.

In the same way, when a predetermined pressure is applied to pin head 35', aperture 31' becomes tighter making pin head 35' smaller allowing pin head 35' to enter into frame hole 126. Once pin head 35' releases, and no pressure is applied, aperture 31' opens and pin head 35' recovers its first predetermined diameter securing connector 30' inside frame hole 126.

In a preferred embodiment, present invention 10 is a single degree of freedom (1 DOF) linear actuator that can move under battery 104, seen in FIG. 6, power and communicating wirelessly.

Figure 11A:
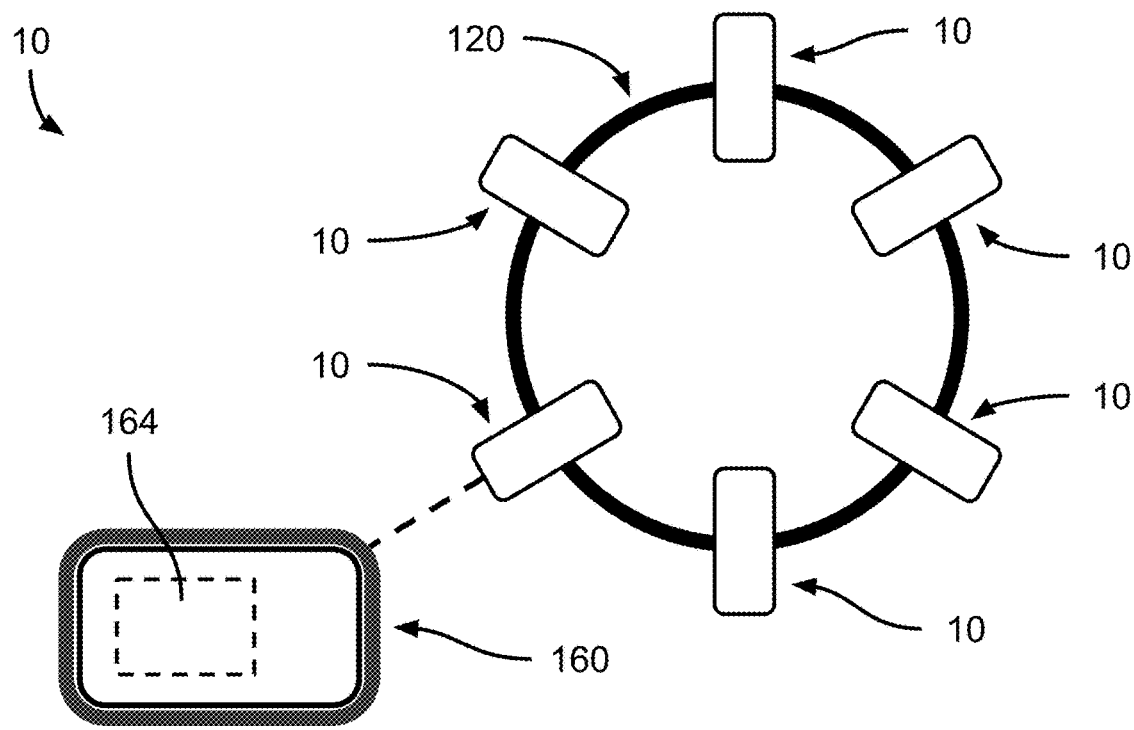
FIG. 11A is a diagram showing the connection of the strut assembly of the present invention with a computer device.
Figure 11B:
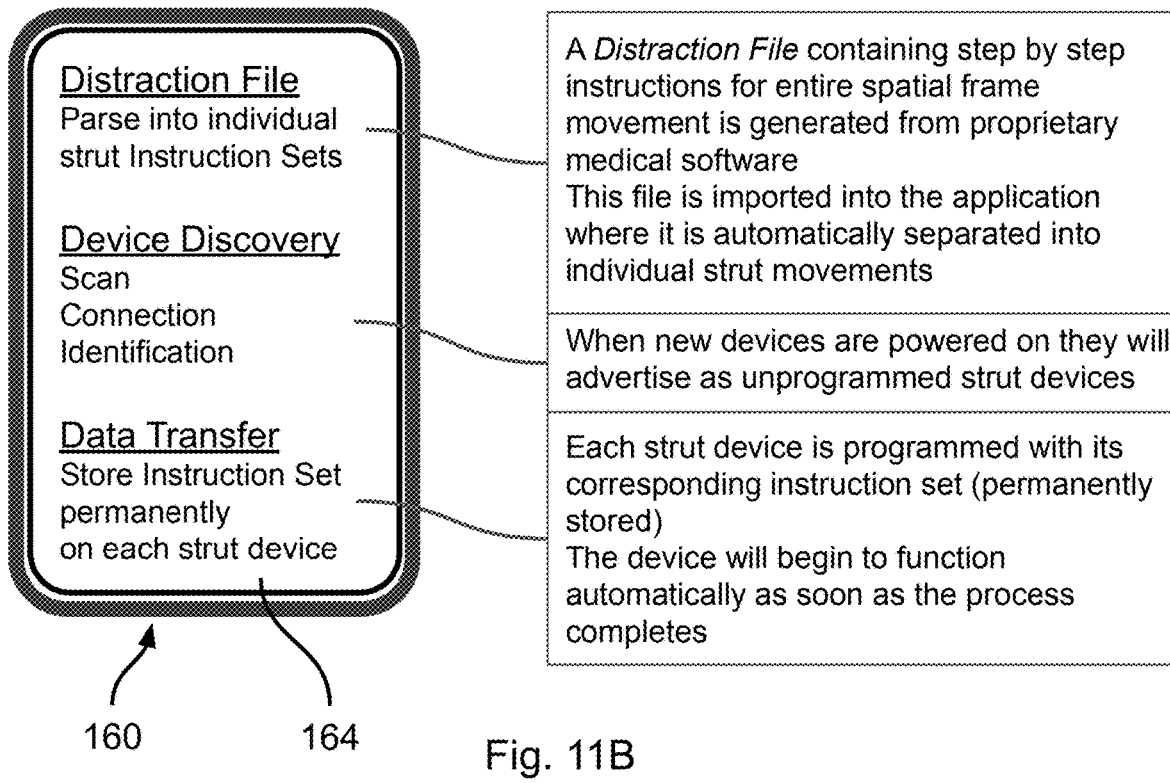
FIG. 11B is a diagram of an algorithm of the present invention.
Figure 12:
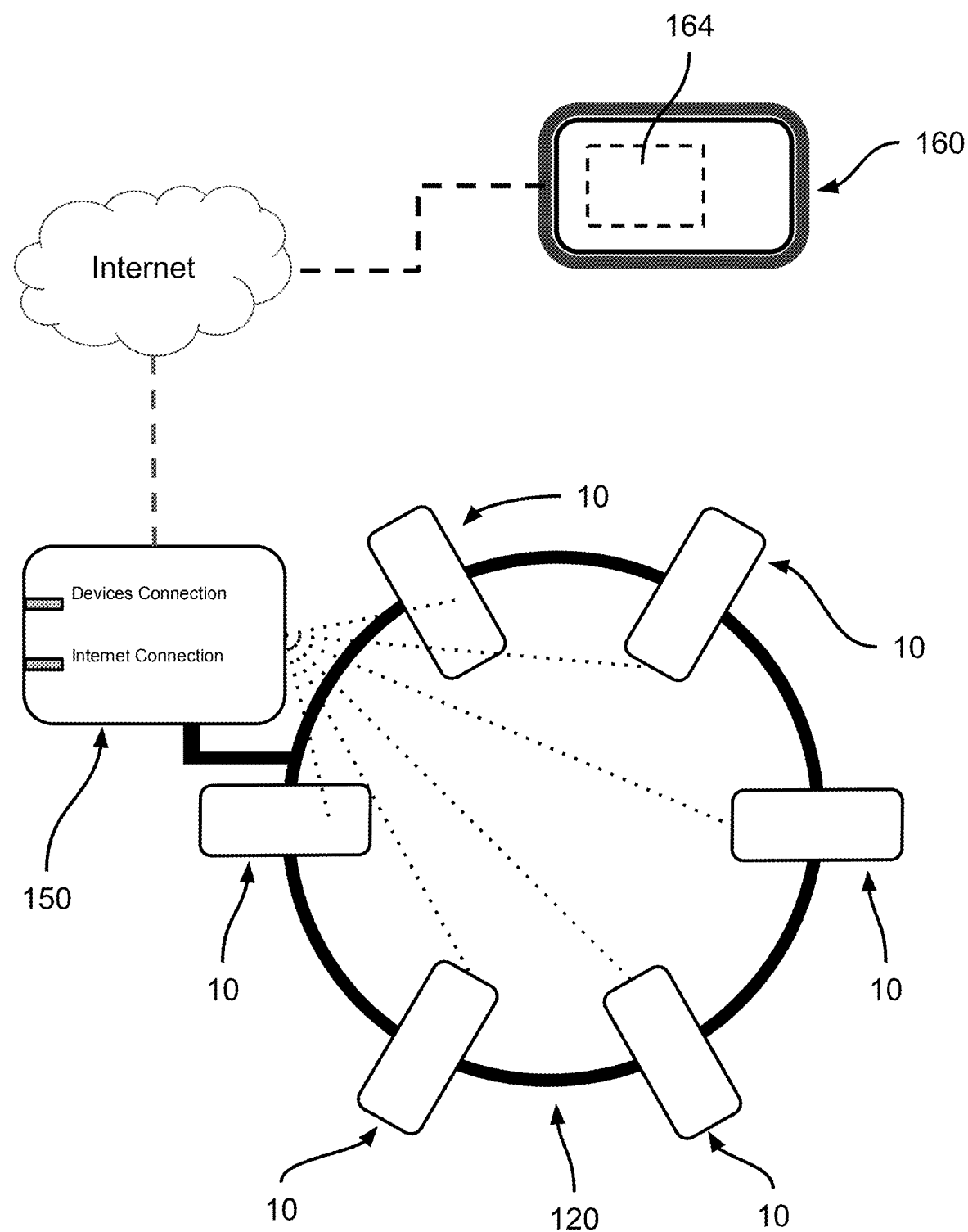
FIG. 12 is a diagram showing an alternative embodiment for the connections between the strut assemblies and the computer device.

As seen in FIGS. 11A, 11B, and 12, computer device 160 wirelessly connects to lead assembly 20 through circuit assembly 88, seen in FIG. 5. Lead assembly 20 is programed through computer device 160 to make scheduled adjustments automatically.

The automated wireless strut assembly 10 further comprises a bridge device for remote connectivity between computer device 160 and each strut assembly 10 from a set of strut assemblies.

Computer device 160 may be any portable or non-portable electronic programable device, including desktop and laptop computers, smartphones, and tablets.

Computer device 160 comprises an executable application 164 having a distraction file containing instructions for entire spatial movements, wherein the distraction file is automatically separated into individual movements of lead assembly 20 and stored for each of circuit assembly 88 along with other information, such as individual device addresses for each strut assembly 10 and a network identifier for the system of devices. The distraction file contains step by step instructions for entire spatial frame movement that is generated from proprietary medical software.

When new strut assemblies 10 are powered on, they will advertise as unprogrammed strut assemblies. Executable application 164 connects to a single unprogrammed device and instructs it to identify itself by visual and/or audible means.

Additionally, through executable application 164 a user may select the corresponding instruction set for each strut assembly 10 connected. The data is transmitted to circuit assembly 88 and stored permanently. Strut assembly 10 begins to function automatically as soon as the process completes.

After the programming process completes, strut assembly 10 is no longer programmable. The device automatically connects to executable application 164 on computer device 160 and transmits data related to monitoring device battery level, distraction progress, error codes, etc.

Present invention 10 may be used to treat bone B deformity or fusing a joint or stabilizing a fracture in a subject.

A method of treating bone B deformity or fusing a joint or stabilizing a fracture in a subject comprises the steps of:
A) Applying external fixator system 120;
B) analyzing radiographs manually or by a software;
C) generating a prescription;
D) entering the prescription into application 164 that communicates with wireless automated strut assemblies or lead assemblies 20 via wireless transmission to store the prescription;
E) adjusting each strut assembly 20 according to the prescription via wireless transmission.

An status and progress of strut assemblies 20 or other patient related data is relayed back to a surgeon via wireless transmission.

The data obtained via the wireless transmission from the strut assemblies 20 is used in the generation of a distraction prescription in the initial prescription generation and/or prescription revisions.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An automated wireless strut assembly, comprising:
A) a lead assembly having a lead shaft, a linear encoder embedded in said lead shaft, a control circuitry, a head assembly and a main body, said head assembly is secured onto a top edge of said lead assembly, whereby first and second channels receive first and second lips of said head assembly;
B) a motor housing having a motor; and
C) a battery assembly.

2. The automated wireless strut assembly set forth in claim 1, wherein said control circuitry reads said linear encoder and said motor moves said lead shaft.

3. The automated wireless strut assembly set forth in claim 1, wherein said lead assembly is coupled to said head assembly, said motor housing, and said battery assembly, whereby said motor housing is coupled to said head assembly and said lead assembly by one of its faces and receives said battery assembly at a bottom.

4. The automated wireless strut assembly set forth in claim 1, wherein said lead assembly comprises an upper clevis having a first connector and a lower clevis having a second connector.

5. The automated wireless strut assembly set forth in claim 4, wherein said main body comprises indents that receive said lower clevis.

6. The automated wireless strut assembly set forth in claim 4, wherein said head assembly comprises a housing, a bearing, a coupler, first and second gears, and a lead nut.

7. The automated wireless strut assembly set forth in claim 6, wherein said housing defines a housing cavity, which receives said lead nut.

8. The automated wireless strut assembly set forth in claim 7, wherein said lead shaft passthrough said housing cavity and said lead nut.

9. The automated wireless strut assembly set forth in claim 6, wherein said motor housing further comprises a main housing, visual wave guides, a lever, and a circuit assembly.

10. The automated wireless strut assembly set forth in claim 9, wherein said battery assembly comprises a battery housing having a top wall, which houses a battery.

11. The automated wireless strut assembly set forth in claim 10, wherein said top wall comprises first and second hollow protrusions, which are secured inside said main housing and by which first and second battery contacts passthrough.

12. The automated wireless strut assembly set forth in claim 9, wherein a computer device wirelessly connects to said lead assembly through said circuit assembly.

13. The automated wireless strut assembly set forth in claim 12, wherein said lead assembly is programed through said computer device to make scheduled adjustments automatically.

14. The automated wireless strut assembly set forth in claim 12, wherein said computer device comprises an executable application having a distraction file containing instructions for entire spatial movements, wherein said distraction file is automatically separated into individual movements of said lead assembly and stored for each of said circuit assembly.

15. The automated wireless strut assembly set forth in claim 6, wherein said coupler allows said lead shaft to engage or disengage with said lead nut.

16. The automated wireless strut assembly set forth in claim 4, wherein a distance between said first and second connectors is automatically adjusted.

17. The automated wireless strut assembly set forth in claim 4, wherein a set of strut assemblies are connected to first and second frames of an external fixation system through respective said first and second connectors, building a wireless independent networking schema for monitoring and self-management of said lead assemblies on said external fixation system.

18. The automated wireless strut assembly set forth in claim 17, wherein further comprises a bridge device for remote connectivity between said computer device and each strut assembly from said set of strut assemblies.

19. The automated wireless strut assembly set forth in claim 4, wherein said first and second connectors pass-through a respective frame hole when a predetermined force is applied.

20. The automated wireless strut assembly set forth in claim 19, wherein a pin head comprises a first predetermined diameter, a pin end comprises a second predetermined diameter, and said frame comprise a third predetermined diameter smaller than said first and second predetermined diameters, whereby said pin end and said pin head act as stoppers securing first and second connectors inside of said respective frame hole.

21. The automated wireless strut assembly set forth in claim 1, wherein said main body comprises a cavity, which receives said lead shaft and said control circuitry is attached to said main body.

22. The automated wireless strut assembly set forth in claim 21, wherein said lead shaft moves linearly through said cavity, whereby said control circuitry is able to read the position of said lead shaft from said linear encoder.

* * * * *